United States Patent [19]
Klement et al.

[11] 3,893,868
[45] July 8, 1975

[54] SEPARATION AGENT FOR MOLDED POLYURETHANE FOAMS

[75] Inventors: Gunter Klement, Dusseldorf-Holthausen; Horst Baumann, Leichlingen; Eugen Scheidt, Dusseldorf-Holthausen, all of Germany

[73] Assignee: Henkel & Cie GmbH, Dusseldorf, Germany

[22] Filed: Oct. 29, 1973

[21] Appl. No.: 410,521

[30] Foreign Application Priority Data
Nov. 11, 1972 Germany............................ 2255310

[52] U.S. Cl. .............. 106/38.24; 106/249; 264/338
[51] Int. Cl................................................. C08g 9/00
[58] Field of Search ......... 260/400; 106/38.24, 249; 264/338

[56] References Cited
UNITED STATES PATENTS

| | | | |
|---|---|---|---|
| 2,185,541 | 1/1940 | Cahn.................................. | 260/400 |
| 2,460,968 | 2/1949 | Bert.................................... | 260/400 |
| 3,413,390 | 11/1968 | Heiss................................... | 264/338 |
| 3,726,952 | 4/1973 | Boden................................. | 264/338 |

OTHER PUBLICATIONS

Auslegeshrift 2014011 March 1970.

*Primary Examiner*—Theodore Morris
*Attorney, Agent, or Firm*—Hammond & Littell

[57] ABSTRACT

A process for the separation of molded polyurethane foams from the mold therefor is achieved by use of solutions of separating agents consisting of a solution of neutral magnesium salts of α-sulfocarboxylic acids having from 8 to 26 carbon atoms in a mixture of 30 to 70 parts by volume of water and 70 to 30 parts by volume of a solvent system, consisting of lower aliphatic alcohols having 1 to 4 carbon atoms and preferably lower aliphatic ketones having 3 to 4 carbon atoms in the ratio of at least 50 parts by volume of alcohol to at most 50 parts by volume of ketone.

11 Claims, No Drawings

SEPARATION AGENT FOR MOLDED POLYURETHANE FOAMS

THE PRIOR ART

The production of polyurethane foams or sponges is sometimes carried out continuously by free expansion in so-called "blocks," and sometimes in closed molds where open-cell or closed-cell foams or sponges with or without a closed outer skin are formed, depending on the composition of the polyurethane foam mixtures. The separation from the mold of the expanded plastics formed causes special problems in the case of the polyurethane foams, since the low molecular weight isocyanates used for their preparation, which are known as adhesives for a variety of purposes, may easily come into contact with the wall of the mold. These difficulties which already exist in the case of separating cast polyurethane from the mold, are considerably increased by the nature of the material in the case of polyurethane foam. Compared with the dense cast polyurethane, the expanded polyurethane material has a substantially lower tensile strength, so that breaks in the material can easily be made during the removal from the mold. In addition, special requirements and difficulties occur in the production of polyurethane expanded bodies with a closed surface, the so-called "integral foams", since with these bodies a flawless copy of the wall of the mold is required even after the mold has been used for a relatively long time. Apart from this, in many cases, for example in the manufacture of shoe soles, a further pigmentation of the surface layer is carried out by a so-called stain. Suitable stains consist, for example, of solutions of organic dyestuffs in a solvent mixture. Small surface irregularities, which for example may be caused by the loosening of very fine films, result in uneven colorations, which become noticeable as spots and flow disturbances, and which cannot be tolerated in the finished product.

According to prior art attempts to overcome these difficulties mentioned above, the difficulties can at present be handled only unsatisfactorily by the use of relatively large amounts of separating agents, which preferably consist of solutions of hydrocarbon waxes, and in some cases in admixture with silicones in petroleum fractions and similar solvents. In some cases it is necessary to apply wax like pastes to the mold wall and to polish the mold wall in order to obtain surface smoothness. However this process cannot be used for the production of integral foams in particular, because fine unevennesses or shallow relief, of the surface of the mold, which is to appear in the foam finished product, is levelled by the separating agent.

Aluminum or magnesium salts of long-chain fatty acids, which have already been proposed as separating agents, can indeed by applied to the mold wall in a thin layer, based upon their solubility properties. However the solutions utilized can only be solutions in trichloroethylene or similar solvents which are dangerous to health. Consequently their use is considerably restricted in practice.

OBJECTS OF THE INVENTION

An object of the present invention is therefore to provide a separating agent which comprises a dilute solution in solvents with the least possible danger to health, which is introduced onto the mold wall in a very thin layer which has a high separating action for polyurethane foams, especially for polyurethane integral foams, which ensures at the same time a flawless surface condition which is if necessary a true reproduction of the mold wall, and apart from this which provides favorable conditions for a possible after-treatment of the surface by staining, varnishing, bonding or similar procedures without a prior cleaning or other intermediate treatment.

It is a further object of the present invention to provide a separating agent solution for the facilitating the release of molded polyurethane foams from molds comprising a solution of a neutral magnesium salt of an aliphatic α-sulfocarboxylic acid having 8 to 26 carbon atoms in an aqueous solvent mixture comprising (I) from 30 to 70 parts by volume of water and (II) from 70 to 30 parts by volume of a solvent comprising (A) from 50 to 100 parts by volume of said solvent of an alkanol having 1 to 4 carbon atoms and (B) from 0 to 50 parts by volume of said solvent of an alkanone having 3 to 4 carbon atoms.

It is a further object of the present invention to provide a development in the process of facilitating the removal of molded polyurethane foam from a mold which comprise applying a solution of a separating agent to the surface of said mold and evaporating away the volatile components of said solution prior to foaming the polyurethane in the mold; wherein the improvement comprises utilizing the above-described separating agent solution as said solution of a separating agent.

These and further objects of the present invention will become apparent as the description thereof proceeds.

DESCRIPTION OF THE INVENTION

The invention relates to solutions for separating molded polyurethane foams from the mold which are based on a solution of neutral magnesium salts of α-sulfocarboxylic acids in an aqueous-organic solvent system. This object is achieved by use of sclutions of separating agents consisting of a solution of neutral magnesium salts of α-sulfocarboxylic acids having from 8 to 26 carbon atoms in a mixture of 30 to 70 parts by volume of water and 70 to 30 parts by volume of a solvent system, consisting of lower aliphatic alcohols having 1 to 4 carbon atoms and preferably lower aliphatic ketones having 3 to 4 carbon atoms in the ratio of at least 50 parts by volume of alcohol to at most 50 parts by volume of ketone.

More particularly the present invention provides a separating agent solution for the facilitating the release of molded polyurethane foams from molds comprising a solution of a neutral magnesium salt of an aliphatic α-sulfocarboxylic acid having 8 to 26 carbon atoms in an aqueous solvent mixture comprising (I) from 30 to 70 parts by volume of water and (II) from 70 to 30 parts by volume of a solvent comprising (A) from 50 to 100 parts by volume of said solvent of an alkanol having 1 to 4 carbon atoms and (B) from 0 to 50 parts by volume of said solvent of an alkanone having 3 to 4 carbon atoms.

The present invention is further directed to a development in the process of facilitating the removal of molded polyurethane foam from a mold which comprises applying a solution of a separating agent to the surface of said mold and evaporating away the volatile components of said solution prior to foaming the polyurethane in the mold; wherein the improvement comprises utilizing the above-described separating agent solution as said solution of a separating agent.

Neutral magnesium salts which are to be utilized in the separating solutions according to the present invention contain, as the anion component, aliphatic α-sulfocarboxylic acids having 8 to 26 carbon atoms as follows: α-sulfoalkanoic acids having 8 to 26 carbon atoms, for example α-sulfocaprylic acid, α-sulfocapric acid, α-sulfolauric acid, α-sulfomyristic acid, α-sulfopalmitic acid, α-sulfostearic acid, α-sulfobehenic acid, and the mixtures thereof. Other suitable anion components are sulfonation products of fatty acids derived from hydrogenated (or hardened) naturally occurring fats and oils where the fatty acids are mixtures of acids having 8 to 26 carbon atoms, for example α-sulfo-hydrogenated peanut oil fatty acid, α-sulfo-hydrogenated rape oil fatty acid, α-sulfo-hydrogenated palm kernel oil fatty acid, α-sulfo-hydrogenated soya bean oil fatty acid, α-sulfo-hydrogenated tallow fatty acid, α-sulfo-hydrogenated fish oil fatty acid, α-sulfo-hydrogenated whale oil fatty acid, and the mixtures thereof.

Further examples of suitable α-sulfocarboxylic acids are those which are prepared by sulfonation of synthetic fatty acids which have been prepared, for example by oxidation of paraffins, carboxylation of organo-metallic compounds, for example organo-aluminum compounds, by oxidative fission of olefinic compounds or by other oxidation reactions, for example by ozonization of olefins and subsequent oxidative fission of the ozonization reaction products with oxygen or in other ways. Such products are all generically α-sulfoalkanoic acids having 8 to 26 carbon atoms.

The preparation of the α-sulfocarboxylic acids may be effected by known processes, for example by complete or partial sulfonation of the corresponding fatty acids by means of sulfur trioxide.

The magnesium salts used according to the invention include those salts obtained by neutralization of the α-sulfo-carboxylic acids with aqueous solutions of magnesium hydroxide, magnesium oxide or magnesium carbonate.

The magnesium salts of the α-sulfocarboxylic acids having 12 to 18 carbon atoms are preferred from the technical and economic view points. Especially preferred are the α-sulfocarboxylic acids having 12 to 18 carbon atoms which are derived from naturally-occurring fats, oils and the mixtures thereof.

The solutions of separating agents according to the invention as well as the magnesium salts of the α-sulfocarboxylic acids contained therein are characterized by a very high separation efficiency. It is suitable to use from 0.1 to 3% by weight, preferably 0.5 to 2% by weight solutions of these salts in an aqueous solvent mixture of 30 to 70 parts by volume of water and 70 to 30 parts by volume of a solvent system comprising 50 to 100 parts by volume of said solvent system of lower aliphatic alcohols and 0 to 50 parts by volume of said solvent system of lower aliphatic ketones.

It is also possible to prepare a solution concentrate of the neutral magnesium salt in the above-described solvent mixture which contains more than 3% by weight of said salt up to the solubility limit of said salt. Before utilizing the separating agent, this concentrate is diluted down to the operating range of 0.1 to 3% by weight of the magnesium salt by one or more of the solvents or water employed to form the solution.

Examples of suitable lower alcohols are alkanols of 1 to 4 carbon atoms such as methanol, ethanol, propanol, isopropanol and butanol as well as mixtures of these alcohols. The use of isopropanol is preferable, especially in a mixture consisting of 50 parts by volume of water and 50 parts by volume of isopropanol, for applying onto moderately hot molds at temperatures between 40° to 70°C.

Examples of suitable ketones include alkanones of 3 to 4 carbon atoms such as acetone or methylethylketone. It is especially preferable to apply the separating solutions containing ketones to molds at lower temperatures, for example at room temperature. The amount of the ketone fraction in such solutions should not exceed about one-third of the total volume of the aqueous solvent mixture.

Repeated removals of the foamed product from the mold after a one time application of the separating solution are possible. On the other hand, with the continuous intermittent application of the separating agent solutions, a very minor amount of error is introduced because of adhering polyurethane foam, even when the application of the separating agent solution is less carefully carried out than for a single application.

Since a very small amount of the magnesium salt of the α-sulfocarboxylic acid is sufficient, a very small amount of the separating solution according to the invention is also sufficient for obtaining a very satisfactory separating action and the reproduction in the foam product of the smallest surface features of the mold presents no difficulties.

Furthermore, articles of polyurethane foam which had been removed from the mold after utilizing the separating solutions of the invention, and which are treated with color stains without any intermediate cleaning, show a completely uniform appearance without spots and flow disturbances after the drying thereof.

The use of the salts of α-sulfocarboxylic acids, also the magnesium salts among others, as separating agents for elastomers, has already been described in the prior art. However the use of water-containing solutions for separating polyurethane foam from a mold, which is particularly advantageous for reasons of health and other technical application grounds, is contrary to the prevailing opinion of those skilled in the art. One reason is that there are short cycle times of a few minutes dictated by the use of high speed production machines such that there is a danger that the polyurethane mixture may be charged into a mold which is still moist. A consequence of this is that an undesirable alteration of the course of the foaming reaction occurs; and consequently defects in the polyurethane foam cannot be avoided.

This circumstance has been taken into account in the above-described prior art use of salts of α-sulfocarboxylic acids as separating agents for cast polyurethanes, since the molds were painted or were coated with the separating agent solutions after having been preheated to 100° to 110°C before charging with the polyurethane. Use of this temperature range caused a positive evaporation of the water of the separating agent solution was attained.

Such a preheating of the molds is not required, however, in the case of the preparation of polyurethane foams according to the present invention. Even with the use of magnesium salts of α-sulfocarboxylic acids in the above-described aqueous solutions as a precautionary step with the use of hot vulcanization molds, which had been preheated to 100° to 110°C, slightly spotted surfaces on the foamed polyurethane after removal from the molds occurred. It was therefore surprising that the neutral magnesium salts of α-sulfocarboxylic acids have proved suitable for separation of molded polyurethane foams from the mold, which foams especially depend upon having a very clean noncontaminated surface. These magnesium salts are introduced into the molds for shaping the polyurethane foam dissolved in a solvent mixture consisting of from 30 to 70 parts by volume of water and from 70 to 30 parts by volume of a solvent system, consisting of lower aliphatic alcohols having 1 to 4 carbon atoms, such as alkanols having 1 to 4 carbon atoms and if desired lower aliphatic ketones having 3 to 4 carbon atoms such as alkanones having 3 to 4 carbon atoms. If the molds to be treated are at a moderate temperature of 40° to 70°C, the solvent mixture may consist only of water and lower alcohols, especially isopropanol, without addition of a ketone. Mold release solutions which consists of equal parts by volume of water and isopropanol are especially preferred when they are applied as a thin coating onto the moderately heated metal molds. When the molds are at a lower temperature of 20° to 40°C the solvent mixture preferably consists of water, said lower aliphatic alcohols and said lower aliphatic ketones. A solvent mixture of about equal parts by volume of water, lower alcohol and lower ketones is preferred. A mixture of approximately equal parts by volume of water, isopropanol and acetone is especially preferred.

A mold made of steel, aluminum or chrome steel may be used for the production of the polyurethane foams. The mold release agents of the invention are then brushed or sprayed onto the inner surfaces of the mold as a thin coating or layer of the separating solutions according to the invention.

the following examples are merely illustrative of the present invention without being deemed limitative in any thereof.

EXAMPLES

The releasing action of the separating layers, prepared by means of the separating solutions according to the invention, and other comparative products, was examined by means of the tests specified below.

TEST A

Separation of hard polyurethane foam (Trade Mark BAYDUR 20 of Farbenfabriken Bayer AG)

Formulation A:
  100 parts by weight of a polyol (DESMOPHEN DD 1650)
  10 parts by weight of a foaming agent (monofluorotrichloromethane)
  105 parts by weight "crude" Diphenylmethane diisocyanate (DESMODUR 44 V 10

The components were quickly mixed together in the indicated sequence and poured into a steel mold, which had been preheated to 55°C ±5°C, and there expanded in the open mold. After 15 minutes at 55°C, the polyurethane foam product was removed from the mold.

Sheets of stainless steel fitting on the bottom of the mold (15 cm × 12 cm) were cleaned with a scouring agent, rinsed repeatedly with water and finally with acetone, and then were dried. Then the sheets were preheated to 55°C and sprayed once with a 1% solution of the separating agent. The sheets were placed on the bottom of the mold and then the polyurethane mixture was poured in.

After the foamed mixture was removed from the mold, the release of the polyurethane foam from the bottom sheets was estimated as follows:
  1 = spontaneous separation
  2 = separation with slight effort
  3 = separation with great effort, break in the polyurethane foam at separate small pieces
  4 = breaks in the polyurethane foam on 10 to 50% of the surface of the sheets
  5 = breaks in the polyurethane foam on over 50% of the surface of the sheets.

TEST B

Separation of semi-hard integral foam (Trade Mark BAYFLEX 30, Farbenfabriken Bayer AG)

Formulation B:
  100 parts by weight premixing of etherpolyol, foaming agent, and amine/catalyst-system (DESMOPHEN 5900 BT)
  45 parts by weight crude, stabilized against hydrolysis DESMODUR 44 (DESMODUR CD)

The components were rapidly mixed at room temperature and poured into a slightly conical, cylindrical mold preheated to 55°C ±5°C. The mold was 110 mm high, the diameter at the base was 100 mm, and the diameter at the top was 95 mm in order to facilitate release from the mold. The degree of filling of the mold (unit weight of the mold) was 280 g/liter. After charging the material and closing the mold, the material was kept for 15 minutes at 55°C, then the expanded body was released from the mold. After storing said expanded body for 1.5 hours in order to cool the initially hot but not very break-resistant interior portion of the foam, the actual separation test was carried out. To test the releasing action of different separation agents, a metal disc was placed on the bottom of the mold, which had a diameter of 58 mm and a thickness of 5 mm. On its "adhesive surface," the surface in contact with the foamed polyurethane, nine square blocks each with a base area of 1 cm² and a height of 5 mm were set symmetrically thereon with an intermediate gap of 5 mm between each block maintained, in order to enlarge the "adhesive surface". The total surface area exposed to the foam amounted to 55.6 cm². This "adhesive test body" was made from one piece by milling. Traces of the cutting tool markings were clearly recognizable on the exposed surface.

As the counterpart to the adhesive test body a disc provided with a threaded screw and having a diameter of about 40 mm was fastened onto the lid of the mold so that it would be surrounded on all sides by polyurethane foam after the foaming thereof. The test body thusly prepared was used in three ways for the evaluation of the compounds used as separating agent:

a. The separating force in kg, was determined at a tearing speed of 50 mm/min by clamping in a tension tester in order to remove the adhesive test body.

b. The separating force was measured according to (a), but repeated without any further appplication of the separating agent. The number of separations was determined until the first break in the foam occurred due to diminution of the separating action.

c. After separation of the adhesive body, the surface of the foam was visually evaluated.

EXAMPLE 1

In order to carry out this experiment the neutral magnesium salt of α-sulfo-hydrogenated palm kernel oil fatty acid was dissolved in a mixture of equal parts by volume of water and isopropanol to give a 1% solution. After spraying this solution onto metal sheets heated to 55°C, a very thin, uniform, practically invisible coating was formed, while the solvent completely evaporated in a short time. The technical application test provided the following results:

| | |
|---|---|
| Separating action according to Test A: | Value 1 |
| Adhesive value according to Test B(a): | 30 kg |
| Number of possible separations up to the first sticking of the PUR foam according to Test B(b): | 6 |
| Visual estimation according to Test B(c): | smooth,spot-free surface,exact copy of the test body surface |

For the preparation of shoe sole molds from a semi-hard integral foam according to formulation B, previously cleaned aluminum molds were sprayed once with the 1% separating solution. The easily removable foam parts had a satisfactory surface. After staining without previous cleaning, a uniformly tinted surface without spots and without flow disturbances resulted, which was directly suited for a further coating of varnish.

EXAMPLE 2

A 0.5% solution in a mixture of 32 parts by volume of acetone, 32 parts by volume of isopropanol and 34 parts by volume of distilled water was made from the neutral magnesium salt of a α-sulfo-hydrogenated palm kernel oil fatty acid according to Example 1. The solution was applied once as a thin coating onto the metal sheets stored at room temperature, and after a very short drying time, formed a uniform almost invisible coating. After the foaming step at room temperature, the separation test was carried out and gave the following test results:

| | |
|---|---|
| Separating action according to Test A: | value 1 |
| Adhesive value according to Test B(a): | 35 kg |
| Number of possible separations up to the first sticking of the PUR foam according to Test B(b): | 5 |
| Visual estimation according to Test B(c): | smooth,spot-free surface, exact copy of the test body surface |

EXAMPLE 3 (Comparative)

For carrying out this experiment the neutral magnesium salt of α-sulfo-hydrogenated palm kernel oil fatty acid according to Example 1 was used as a 1% solution in distilled water. After spraying the solution onto metal surfaces heated to 55°C, it formed an uneven coating, which dried very slowly. The results according to Test A were a value of 3, because there was a very different separation action in various places of the mold surface.

EXAMPLE 4 (Comparative)

The separating agent solution for this experiment was a 1% solution of the magnesium salt of the monomethyl ester of α-sulfo-hydrogenated palm kernel oil fatty acid in a solvent mixture of equal parts by volume of water and isopropanol. This separating agent was tested for its separating action in combination with polyurethane foam according to the procedure of Example 1, wherein the following test results were obtained:

| | |
|---|---|
| Separating action according to Test A: | value 2 |
| Adhesive value according to Test B(a): | 54 kg |
| Number of separations up to the first sticking according to Test B(b): | 2 |
| Visual test according to Test B(c): | open foam surface, no continuous skin |

EXAMPLE 5 (Comparative)

Utilizing a procedure analogous to that described in Example 1, a 1% solution of the disodium salt of α-sulfo-hydrogenated palm kernel oil fatty acid in equal parts by volume of water and isopropanol was tested, wherein the following results were obtained:

| | |
|---|---|
| Separating action according to Test A: | value 1 |
| Adhesive value according to Test B(a): | 49 kg |
| Number of separations up to sticking according to Test B(b): | 5 |
| Visual test according to Test B(c): | spotted surface |

EXAMPLE 6 (Comparative)

For carrying out this experiment the sodium salt of α-olefin-sulfonic acid ($D_{15}$ to $C_{18}$) described as a prior art separating agent for elastomers, was used according to the procedure of Example 1 in a 1% solution in a mixture of equal parts by volume of water and isopropanol. The following results were thereby obtained:

| | |
|---|---|
| Separating action according to Test A: | value 1 |
| Adhesive value according to Test B(a): | 28 kg |
| Number of separations up to the first sticking according to Test B(b): | 13 |
| Visual test according to Test B(c): | mat surface,spotted in separate places |

EXAMPLE 7 (Comparative)

For a further comparative experiment a commercial separating agent containing a hydrocarbon wax (Trade Mark MARK LR 780 SD, Firm of Marbo S.p.a., Italy), which had a solid content of 2.3%, was used as received according to the procedure of Example 1. The test provided the following results:

| | |
|---|---|
| Separation action according to Test A: | value 1 |
| Adhesive value according to Test B(a): | 22 kg |
| Number of separations up to the first sticking according to Test B(b): | 7 |
| Visual test according to Test B(c): | white deposits on the surface, indefinite reproduction of the metal surface |

The white deposits after one application of separating agent, were found after repeated separations in always the same way, until sticking of the foam to the metal body occurred. Thus it can be seen that even by an alteration of the concentration applied, this surface defect cannot be prevented.

EXAMPLE 8 (Comparative)

For this comparative experiment a further commercial separating agent based on a combination of hydrocarbon wax and silicone (Trade Mark ACMOSIL 180 ST, Firm Acmos, Bremen, Germany) with a solid content of 1.7%, was likewise in used and tested as received analogously to the procedure described in Example 1.

| | |
|---|---|
| Separation action according to Test A: | value 1 |
| Adhesive value according to Test B(a): | 38 kg |
| Number of separations up to the first sticking according to Test B(b): | 4 |
| Visual test according to Test B(c): | white deposits, even with repeated separation after one application of separating agent. |

If strict requirements are placed on the appearance of the surface, or if further surface treatments such as staining or varnishing are to be carried out, the white deposits must previously be removed by a special cleaning step.

The present invention has the advantages, as when compared with previously known commercial separating agents, as shown by the preceeding examples of providing a separating agent which comprises a dilute solution of solvents with the least possible danger to health, which is introduced onto the mold wall in a very thin layer, which has a high separating action for polyurethane foams, especially for polyurethane integral foams, which ensures at the same time a flawless surface condition which is if necessary a true reproduction of the mold walls, and which in addition to this provides favorable conditions for possible after-treatment of the surface by staining, varnishing, bonding or similar procedures without a prior cleaning or other intermediate treatment.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A separating agent solution for the facilitating of the release of molded polyurethane foams from molds consisting essentially of a solution of a neutral magnesium salt of an aliphatic $\alpha$-sulfocarboxylic acid having 8 to 26 carbon atoms in an aqueous solvent mixture consisting essentially of (I) from 30 to 70 parts by volume of water and (II) from 70 to 30 parts by volume of a solvent consisting essentially of (A) from 50 to 100 parts by volume of said solvent of an alkanol having 1 to 4 carbon atoms and (B) from 0 to 50 parts by volume of said solvent of an alkanone having 3 to 4 carbon atoms.

2. The separating agent solution of claim 1 in which said salt is a neutral magnesium salt of an aliphatic $\alpha$-sulfocarboxylic acid having 12 to 18 carbon atoms.

3. The separating agent solution of claim 1, in which the amount of said salt is 0.1% to 3% by weight.

4. The separating agent solution of claim 1, in which the amount of said salt is 0.5 to 2% by weight.

5. The separating agent solution of claim 1, in which said aliphatic $\alpha$-sulfocarboxylic acid having 8 to 26 carbon atoms are $\alpha$-sulfoalkanoic acids having 8 to 26 carbon atoms and their mixtures.

6. The separating agent solution of claim 5, in which said aliphatic $\alpha$-sulfocarboxylic acid having 8 to 26 carbon atoms are the $\alpha$-sulfonation products of fatty acids having 8 to 26 carbon atoms derived from hydrogenated naturally occurring fatty acid glycerides.

7. The separating agent solution of claim 1, in which said aliphatic $\alpha$-sulfocarboxylic acid having 8 to 26 carbon atoms is selected from the group consisting of $\alpha$-sulfocaprylic acid, $\alpha$-sulfocapric acid, $\alpha$-sulfolauric acid, $\alpha$-sulfomyristic acid, $\alpha$-sulfopalmitic acid, $\alpha$-sulfostearic acid, $\alpha$-sulfobehenic acid, $\alpha$-sulfo-hydrogenated peanut oil fatty acids, $\alpha$-sulfo-hydrogenated rape oil fatty acid, $\alpha$-sulfo-hydrogenated palm kernel oil fatty acid, $\alpha$-sulfo-hydrogenated soybean oil fatty acid, $\alpha$-sulfo-hydrogenated tallow fatty acid, $\alpha$-sulfo-hydrogenated fish oil fatty acid, $\alpha$-sulfo-hydrogenated whale oil fatty acid, and the mixtures thereof.

8. The separating agent solution of claim 7, in which said aliphatic $\alpha$-sulfocarboxylic acid having 8 to 26 carbon atoms is $\alpha$-sulfo-hydrogenated palm kernel oil fatty acid.

9. The separating agent solution of claim 1, in which alkanol is isopropanol.

10. The separating agent solution of claim 1, in which said aqueous solvent mixture consisting essentially of 50 parts by volume of water and 50 parts by volume of isopropanol.

11. The separating agent solution of claim 1, in which said aqueous solvent mixture consisting essentially of approximately equal parts by volume of water, isopropanol and acetone.

* * * * *